United States Patent Office 3,322,699
Patented May 30, 1967

3,322,699
CELLULAR POLYURETHANES AND PROCESS
FOR PREPARING SAME
Rudolf Merten, Cologne, Flittard, and Otto Bayer, Leverkusen, Bayerwerk, Germany, assignors to Farbenfabriken Bayer Aktiengesellschaft, Leverkusen, Germany, a German corporation
No Drawing. Filed Jan. 30, 1964, Ser. No. 341,439
Claims priority, application Germany, Feb. 1, 1963, F 38,893
10 Claims. (Cl. 260—2.5)

This invention relates generally to a method of preparing polyurethanes and more particularly to a method for making flameproof and cross-linked polyurethanes.

Foam materials containing urethane groups and having varying physical properties have long been produced on an industrial scale by the isocyanate polyaddition process from compounds having reactive hydrogen containing groups. More especially, compounds containing hydroxyl and/or carboxyl groups have been reacted with polyisocyanates, and concurrently, if desired, with water, blowing agents, activators, emulsifiers and other additives as illustrated in Angew. Chemie, A 59, 1948, p. 257, and Pocketbook "Bayer-Kunstoffe," 2nd edition, 1959, p. 25. Hence, foam plastics based on polyisocyanates are advantageously produced by mixing the liquid components together. These components may be either simultaneously mixed together or an initial adduct containing NCO groups is first prepared from a polyhydroxyl compound which is reacted with an excess of polyisocyanate, and this adduct is then transformed in a second step by reacting it with water to produce a plastic cellular material.

By using such processes, it is possible to produce both elastic and rigid foam plastics and all the variants which lie between these limits, merely by making a suitable choice of the components. However, such polyurethane products are not always flameproof and even the most fortunate choice of components will not always result in a foam plastic product which has a sufficiently high degree of cross-linking in addition to having high mechanical values, low brittleness and a low tendency to shrinkage for many applications. In addition, the components of the reaction mixture must be mutually compatible with one another so that a cellular polyurethane may be produced which has optimally advantageous properties in addition to having ease of fabrication.

It is, therefore, an object of this invention to provide a method for the production of plastic cellular material which is devoid of the foregoing disadvantages. It is a further object of this invention to provide a method for the production of plastic foam products from novel components by which it is possible to produce a foam having high mechanical values, low brittleness, good adhesion, satisfactory pore structure and low tendency to shrinkage. It is a further object of this invention to provide a method for the production of cellular polyurethane foams which utilizes inexpensive starting materials. A still further object is to provide a polyurethane plastic having good physical and mechanical properties in addition to being flameproof.

The foregoing objects and others which will become apparent from the following description are accomplished in accordance with this invention, generally speaking, by providing a method for preparing cellular polyurethanes by the reaction between an organic polyisocyanate and a compound containing at least two active hydrogen containing groups as determined by the Zerewitinoff method, and, if desired, water, blowing agents, activators, emulsifiers and/or other additives, which process is characterized in that the active hydrogen containing compound which is reacted with the organic polyisocyanate is a polyester obtained by the polycondensation of a polyhydric alcohol with a halogen containing aliphatic and/or araliphatic polycarboxylic acid or a derivative thereof, which polycarboxylic acid or the derivative thereof has been obtained by the substitution addition of halogen to an aliphatic C—H bond and/or aliphatic double bonds of a compound capable of adding across a double bond under radical-forming conditions and in the presence of an $\alpha,\beta$-unsaturated polycarboxylic acid or a derivative thereof.

The polycarboxylic acids utilized in the process of this invention may be prepared by methods well known in the art. Aliphatic or araliphatic compounds having C—H bonds in the aliphatic constituent thereof, and having no groups which may be reactive with respect to halogen compounds are subjected to halogenation under radical-forming conditions in the presence of an $\alpha,\beta$-unsaturated polycarboxylic acid or a derivative thereof. Such radical-forming conditions are preferably provided by high energy radiation; however, azo compounds or peroxides which are known to be radical-forming compounds may also be used. Examples of such compounds are, for example, benzoyl peroxide, t-butyl peroxide, cumene hydroperoxide and azoisobutyronitrile.

Any suitable $\alpha,\beta$-unsaturated polycarboxylic acid or ester or anhydride thereof can be used. The $\alpha,\beta$-unsaturated polycarboxylic acids or their esters or anhydrides which are especially suitable in the practice of this invention are maleic acid, fumaric acid, chloromaleic acid, aconitic acid, itaconic acid, dihydromuconic acid, 1,2,3-tricarboxy-1-propane and derivatives of all of these. It is to be understood that references made hereinafter to the $\alpha,\beta$-unsaturated polycarboxylic acids are meant to include any of those polycarboxylic acids suitable in the practice of this invention in addition to the esters and anhydrides thereof.

Alkyl esters of polycarboxylic acids having 1 to 6 carbon atoms in the ester group are especially suitable in the process of this invention.

As starting materials in the production of the halogen-containing polycarboxylic acids, any suitable compound capable of adding across the double bond under radical-forming conditions such as aliphatic and/or araliphatic hydrocarbons and olefines which may also contain halogen atoms or carboxy or carboalkoxy groups may be used. These compounds are briefly referred to hereinafter as "hydrocarbons" and some suitable examples of these compounds are aliphatic or araliphatic hydrocarbons with at least four carbon atoms, such as butane, pentane, dodecne, hexadecane; technical paraffin mixtures, paraffin slack wax or turpentine oil; oligomers of alkenes such as polyethylenes, polyisobutylenes, polybutenes; araliphatic compounds such as toluene, xylene, isopropylbenzene, diisopropylbenzene, nonylbenzene, dodecylbenzene; also halogenated aliphatic and araliphatic compounds such as butyl chloride, amyl chloride, stearyl chloride, chlorotoluene, bromotoluene, and bromoxylene. Furthermore, olefines such as dodecane or carboxylic acids having only one carboxyl group as the sole hydrogen containing group and their technical mixtures such as stearic acid, oleic acid, linseed oil fatty acid, fish oil fatty acid, train oil fatty acid and tall oil fatty acid can be used as "hydrocarbons."

The halogenating agent preferably used is chlorine or bromine, and the addition halogenation is generally carried out by introducing the halogen dropwise or under pressure by pumping it into the appropriate mixture of "hydrocarbons" in the presence of an $\alpha,\beta$-unsaturated polycarboxylic acid. This halogenation addition is carried out while irradiating the mixture with ultra-violet rays, or, if preferred, with the concurrent use of catalytic quantities of the hereinbefore designated radical formers which are substituted for the ultra-violet irradiation in the formation of the halogenated polycarboxylic acid. Nitrogen is then used to exhaust the system of any hydrogen halide which may have been formed in the process of this reaction.

The proportions of the components of the reaction mixture for the formation of the halogenated polycarboxylic acid are so adjusted that preferably 0.1 to 3.0 parts of the polycarboxylic acid or a derivative thereof are used to 1 part by weight of the "hydrocarbon" constituent. Generally, 1 to 5 mols of the halogen compound per mol of the "hydrocarbon" are used, but it is to be understood that the quantity of halogen introduced into the reaction mixture may vary widely, with the range included herein being the most expedient one for the purposes of this invention.

In the preferred method for fabricating the halogenated polycarboxylic acid, the "hydrocarbon," the α,β-unsaturated polycarboxylic acid, and the halogen are mixed together substantially, simultaneously under ultra-violet irradiation. The reaction for the formation of such a halogenated polycarboxylic acid using maleic acid, butane and chlorine by way of illustration may take place as follows:

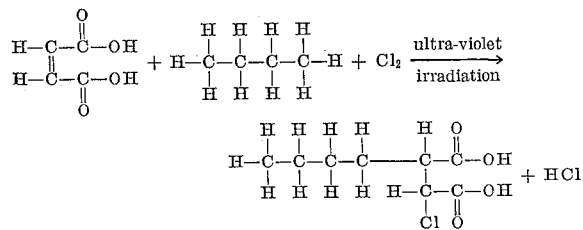

This reaction may also take place in steps, if desired. For example, the hydrocarbon constituent may be reacted with the α,β-unsaturated polycarboxylic acid in a preliminary reaction and the halogen may be introduced thereafter, or the "hydrocarbon" constituent may be halogenated first and then reacted with the α,β-unsaturated polycarboxylic acid, said reactions taking place under the radical-forming conditions designated above.

The crude mixture thus obtained can thereafter be used immediately in the fabrication of the polyester. Any unreacted materials remaining in the mixture are esterified by conventional methods with polyhydric alcohols at temperatures of 150 to 250° C., for example, and with the addition of re-esterification or esterification catalysts such as titanium alcoholates, lead oxide, sodium carbonate or toluene sulfonic acids. Small quantities of monofunctional components which may possibly originate from a re-esterification have no detrimental effect on the formation of the cellular polyurethane product in the process of this invention.

In the formation of the polyester, any suitable polyhydric alcohol may be used such as, for example, dihydric and polyhydric alcohols of aliphatic, cycloaliphatic, aromatic or heterocyclic nature. Examples are ethylene glycol, diethylene glycol, triethylene glycol, polyethylene glycol, propylene glycol, dipropylene glycol, tripropylene glycol, propane-1,3-diol, butane-1,2-diol, butane-1,3-diol, butane-1,4-diol, and butane-2,3-diol, 1,5-pentanediol, 1,4-pentanediol, 1,3-pentanediol, hexane-2,5-diol or hexane-1,6-diol, octadecanediol and octadecenediol, butene-1,4-diol and butine-1,4-diol, glycerine, trimethylolpropane, pentaerythritol, 1,3,6-hexanetriol, 1,7 - heptanediol, mannitol, sorbitol, glucose, fructose, mannose, cane sugar, invert sugar, solutions of invert sugar in polyalcohols, hydrolyzed starches, cyclohexane-1,4-dimethanol, hydroxy alkylated hydroquinone or diphenylol alkanes, and also amino alcohols such as triethanolamine or hydroxylkated ethylene diamines or phenylene diamines. The polyhydric alcohols which are used can also be of higher molecular weight, such as castor oil.

The quantity of polyhydric alcohol to be used in the polycondensation reaction with the halogenated polycarboxylic acid depends largely on the nature of the required final product. Polyhydroxyl compounds with the lowest possible acid numbers can be prepared by using an excess of alcohol and choosing suitable esterification conditions; in such a case, one mol of polyhydric alcohol per mol of carboxyl groups is used in order to avoid the formation of condensates of higher viscosity than is required. On the other hand, should it be so desired, products with higher acid numbers can be prepared by not completing the esterification, or else, by using anhydrides of unsaturated acids, and merely effecting an addition of the polyhydric alcohol to the anhydride group. The latter alternative is especially expedient when using polyhydric alcohol components of low heat resistance, such as carbohydrates, for example.

For the purposes of modification, the polyhydroxyl compounds which are obtained by the process of this invention may be subjected to a subsequent halogenation with chlorine or bromine, for example. A further modification consists in the concurrent use of saturated polycarboxylic acids, such as phthalic acid, adipic acid, sebacic acid, dimerised and trimerised fatty acids, succinic acid and terephthalic acid with the reactants involved in the esterification reaction. In addition, the polyester produced by the process of this invention may be mixed with other known polyhydroxyl compounds such as polyesters, polyethers, polythioethers, polyacetals, simple adducts of alkylene oxides with polyamines, and also alkylene oxide adducts of aminonitrile compounds as illustrated in U.S. application Ser. No. 308,347, filed Sept. 12, 1963 and now U.S. Patent No. 3,284,377, with polyphosphites as illustrated in U.S. application Ser. No. 220,078, filed Aug. 28, 1962 and now abandoned, and with alkoxylated phosphoric acids.

The polyhydroxyl compounds thus obtained are light yellow to brown substances which generally have a low viscosity at least two active hydrogen containing groups as determined by the Zerewitinoff method, but generally have an hydroxyl content of about 3% to 18%. Because of the substitution-addition of the halogen to the polycarboxylic acid derivative, the polyesters show a high functionality and therefore the foam plastic products formed exhibit a high degree of cross-linking. In addition, the introduction of halogen atoms into the polyester structure creates a flame-inhibiting effect.

These polyhydroxyl compounds are then reacted with polyisocyanates and water and/or other blowing agents, and optionally, additives such as fillers, stabilizers, emulsifiers and the like. Any suitable organic polyisocyanate may be used including aliphatic and aromatic polyisocyanates, but it is preferred to use an aromatic di- or higher polyisocyanates preferably having from 2 to 4 free —NCO groups. Examples of suitable organic polyisocyanates including the heterocyclic organic polyisocyanates are 1,6-hexamethylene diisocyanate, 1,4-butylene diisocyanate, furfurylidene diisocyanate and the preferred aromatic polyisocyanates including 2,4-toluylene diisocyanate, 2,6 - toluylene diisocyanate and mixtures thereof, preferably a mixture of about 80 percent 2,4- and 20 percent 2,6-toluylene diisocyanate, 4,4'-diphenylmethane diisocyanate, 4,4'-diphenyl - 3,3-dimethyl methane diisocyanate, 1,5-naphthalene diisocyanate, 1-methyl-2,4-diisocyanato - 5 - chlorobenzene, 1-methyl-2,4-diisocyanato cyclohexane, p-phenyl diisocyanate, 1,5-naphthalene diisocyanate, 4,4',4"-triphenyl methane triisocyanate; the biuret polyisocyanates prepared by reacting, for example, hexamethylene diisocyanate with water and the like. In addition, it is often advantageous to use organic polyisocyanates and particularly mixtures or organic polyisocyanates wich are in admixture with the by-products produced during the phosgenation of the corresponding amine. Suitable polyisocyanates of this type are, for example, the polyphenyl polymethylene polyisocyanates and other similar polyaryl polyalkylene polyisocyanates prepared by the phosgenation of a reaction product of an aromatic primary amine with an aldehyde or ketone such as formaldehyde or methyl ethyl ketone. Suitable compounds of this type are disclosed in U.S. Patents 2,683,730 and 2,760,953, in British Patent 874,430 and Canadian Patent 665,495. A particularly advantageous mixture of polyphenyl polymethylene polyisocyanates is prepared by phosgenating the reaction product of aniline with formaldehyde. This product is preferably prepared by first condensing aniline with formaldehyde under acid conditions and in such proportions that from about 40 to about 65 percent of the resulting mixture of polyphenyl methylene polyamines is a diphenyl methane diamine such as 4,4'-diphenyl methane diamine and the balance of the reaction mixture includes various corresponding triamines, tetra-amines and the like. This mixture of amines when phosgenated will produce an isocyanate which could be represented by the general formula:

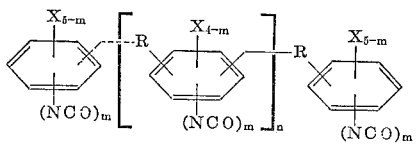

in which R is an organic radical and preferably an aliphatic radical obtained by removing the carbonyl oxygen from an aldehyde or ketone and is preferably —CH$_2$—, $m$ is 1 or 2, X is halogen, lower alkyl or hydrogen and $n$ is 0, 1, 2, or 3. The aliphatic radical, R in the foregoing formula may be obtained by removing the carbonyl oxygen from any suitable aldehyde or ketone such as, formaldehyde, acetaldehyde, propionaldehyde, butyraldehyde, n-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde,

the radical remaining is a methylene radical or from acetone,

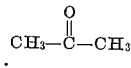

the radical remaining is

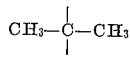

When X is halogen, it may be any suitable halogen, but is preferably chlorine or bromine and further, it is preferred that the amount of chlorine or bromine fall between about one percent and fifteen percent by weight of the compound. When X is lower alkyl, it is most preferably methyl or ethyl, but other lower alkyl radicals such as propyl, butyl and the like may be the radical, X. The polyaryl alkylene polyisocyanates of the invention are preferably mixtures of di- and higher polyisocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent penta-isocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well-known and available commercially. They may be prepared as disclosed in U.S. Patent 2,683,730. A specific isocyanate suitable for use in accordance with the present invention may be obtained by reacting about 60 parts of aniline with about 25 parts of formaldehyde (aqueous, 37 percent CH$_2$O) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention. The best products have 40 percent to 60 percent 4,4'-diphenyl methane diisocyanate, an amine equivalent of about 125 to about 140, about 0.04 to about 0.4 percent by weight hydrolyzable chloride, about 0.1 to about 0.6 percent by weight total chloride and having a flash point of above about 400° F.

Still another category of organic polyisocyanates which could be used are the so-called unrefined toluylene diisocyanates. When toluylene diisocyanate is produced by phosgenation of relatively pure toluylene diamine, for example, a mixture of about 80 percent, 2,4- and 20 percent 2,6-toluylene diamine, a mixture of products results which even without distillation is liquid and desirable for the production of cellular polyurethane plastics. This product is also contemplated for use in the method of the present invention, in addition to polyisocyanates masked with phenol, for example, or bisulfite and acetal-modified isocyanates or those which have been polymerized and in which isocyanurate rings have been formed.

The quantity of the organic polyisocyanate to be used must be at least equivalent to the existing sum of the reactive hydrogen atoms present in the reaction mixture. Should it be so desired, an excess proportion of isocyanate groups may be incorporated into the foam structure by the polymerization reactions or secondary addition reactions. When water is used as the blowing agent, however, a corresponding increase in the quantity of the isocyanate is required in order to efficiently accomplish the blowing of the polyurethane reaction mixture. Instead of or in addition to the use of water as the blowing agent, any other suitable agents may be used in the practice of this invention in order to blow the foam, such as, for example, azo compounds, low-boiling hydrocarbons, halogenated methanes or ethanes or vinylidene chloride.

In the production of the polyurethane foams, in addition to the organic polyisocyanate and the active hydrogen containing compound and the blowing agent, it is often advantageous to include other components which aid in making a product having the best physical properties. It is particularly desirable to use a catalyst and a stabilizer. Any suitable catalyst may be used, but as has been proposed heretofore, it is often desirable to have a mixture of a tin compound and a tertiary amine catalyst present. Any suitable tin compound may be used including, for example, stannous chloride or an organic tin compound. It is preferred to use the organic tin compounds such as the stannous salts of carboxylic acids including stannous oleate, stannous octoate, stannous stearate and the like. But one may also use tetravalent tin compounds including for example dibutyl tin dilaurate, dibutyl tin di-2-ethyl hexoate and the like. Any suitable tertiary amine catalyst may be used and a particularly strong tertiary amine catalyst is triethylene diamine. If weaker catalysts are desired one may use, for example, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

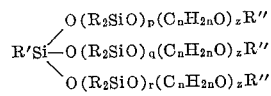

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. A preferred compound has the formula

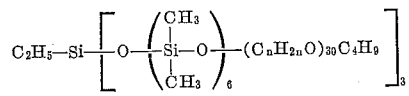

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,478; 668,537 and 670,091. Other suitable compounds may therefore have the formula

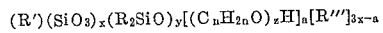

where X is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that methods of determining the chain length of the polysiloxane chains and the polyoxyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula R₃Si— where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

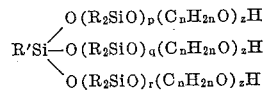

where $p+q+r=y$ of the above formula and has a minimum value of 3, the other subscripts being the same as in the foregoing formula. In this instance, all three of the oxyalkylene chains are joined to the end of polysiloxane chains of the type —$(R_2SiO)$—. Specifically one could use

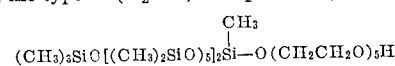

Another class of stabilizer could be represented by the generic formula

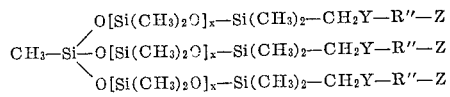

wherein $x$ is from 1 to 150, Y is —NH, —NR', =N—CO—R', =N—CH₂CH₂—Z or O; R' is alkyl or aryl such as methyl, ethyl, propyl, phenyl or the like; R'' is an alkylene radical preferably having from 2 to 6 carbon atoms such as ethylene, propylene, isopropylene, butylene, hexylene or the like, and Z is —NH₂, —OH, —NR'₂, —OR' or the like. Specifically one could use

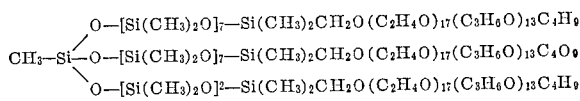

Some other additives which can be used may be emulsifiers, such as hydroxyethylated phenols or biphenylols, higher sulphonic acids, sulphuric acid esters of castor oil or ricinoleic acid, ammonium salts of oleic acid, and dyestuffs pigments and additional flame-proofing agents.

The foam plastics of this invention are mixed and reacted in a manner known in the art by manual mixing, or by mechanical mixing of the components in an apparatus such as the one disclosed in U.S. Reissue Patent 24,514. Foam plastics with high mechanical values, low brittleness, good adhesion, satisfactory pore structure and low tendency to shrinkage are produced. In addition the systems show a good mutual compatibility, especially with respect to the halogenated methane and ethane derivatives frequently used as blowing agents.

The polyurethane foams of the invention are particularly useful for the preparation of insulation, for example in refrigerators or in the walls of a dwelling, for example. They may also be used to prepare floats or for the preparation of decorative articles or cushions, pillows and the like.

The invention is further illustrated but not limited by the following examples in which all parts and percentages are by weight unless otherwise specified.

PRODUCTION OF STARTING MATERIALS

*Polyester A*

To about 200 parts of a mixture of branched and unbranched saturated aliphatic hydrocarbons boiling between 230 and 320° C. there are added about 98 parts of maleic anhydride, and about 160 parts of chlorine are conducted therethrough at about 50 to 60° C. while exposing to ultra-violet light. Another about 98 parts of maleic anhydride are then added and similar treatment is carried out with about 190 parts of chlorine. After exhausting with nitrogen, there are obtained about 529 parts of a chlorinated polycarboxylic acid, which are thereafter esterfied with about 583 parts of diethylene glycol at up to about 170° C./100 mm. Hg. There is then obtained a light yellow polyester with 10.3% OH; acid number 12.5 and 10.1% Cl.

*Polyester B*

About 106 parts of p-xylene are chlorinated with about 315 parts by weight of chlorine while irradiating with ultra-violet light at about 50 to 60° C. in the presence of about 196 parts of maleic anhydride which are added in portions. After exhausting with nitrogen, about 595 parts of a polyanhydride are obtained, which are esterfied immediately after adding about 795 parts of diethylene glycol at up to about 170° C./100 mm. Hg. There is hereby obtained a polyester with 7.2% OH, an acid number of 26.3, 11.5% Cl and a viscosity of 3345 cp./25° C.

Polyester C

In a manner analogous to polyester A, a total of about 294 parts of maleic anhydride are added with the chlorination. About 203 parts of chlorine are taken up. About 465 parts of the polycarboxylic acid are esterfied directly with about 497 parts of diethylene glycol at up to about 170° C./100 mm. Hg to give about 696 parts of a polyester with 5.0% OH; acid number 28.7; 14.4% Cl and a viscosity of 26540 cp./25° C.

Polyester D

Petroleum ether is added to about 950 parts of the chlorinated polycarboxylic acid described under polyester C and the precipitated maleic anhydride is filtered off by suction. The petroleum ether solution is concentrated at about 80° C./12 mm. Hg; there remains about 700 parts of a liquid polycarboxylic acid, which is esterified with about 320 parts of diethylene glycol at up to about 170° C./20 mm. Hg. There are obtained about 856 parts of polyester with 6.7 OH and a viscosity of 5000 cp./25° C.

Polyester E

Into about 600 parts of technical, distilled tall oil fatty acid (acid number 186; iodine number 135), there are introduced about 225 parts of chlorine in the presence of about 196 parts of maleic anhydride with exposure to light and at about 50 to 60° C. Exhaustion is carried out for two hours at about 60° C. with nitrogen and there are obtained about 959 parts of a polycarboxylic acid, which is immediately esterified with about 636 parts of diethylene glycol at up to about 170° C./12 mm. Hg. There are obtained about 1366 parts of polyester with 4.7% OH; acid number 5.1; 7.9% Cl and a viscosity of 7200 cp./25°.

The production of a brominated polyester can take place in similar manner.

EXAMPLE 1

About 100.0 parts of polyester A are thoroughly mixed with about 2.0 parts of permethylated amino ethyl piperazine (about 0.3 part of polysiloxane polyalkylene glycol ester and about 6.0 parts of sodium castor oil sulphate (50° water). After adding about 129.0 parts of diphenylmethane-4',4'-diisocyanate (90%) a difficultly combustible hard foam plastic is obtained with the following physical properties:

Weight per unit volume _____ 54 kg./m.³.
Compressive strength _____ 3.5 kg./cm.².
Impact toughness _____ 0.4 kg./cm.
Hot-bending strength _____ 95° C.
Water absorption _____ 2.8 vol. percent.

EXAMPLE 2

About 70.0 parts of polyester B are mixed with about 30.0 parts of a polyester of adipic acid, phthalic acid, oleic acid and trimethylol propane (OH number 380). About 4.0 parts of ethyl morpholine, about 0.3 part of polysiloxane polyalkylene glycol ester and about 6.0 parts of sodium-castor oil sulphate (50% water). After adding about 117.0 parts of diphenylmethane-4,4'-diisocyanate (90%), a flame-proofed hard foam plastic is obtained with the following mechanical properties:

Weight per unit volume _____ 48 kg./m.³.
Compressive strength _____ 2.48 kg./cm.².
Impact toughness _____ 0.2 kg./cm.
Hot-bending strength _____ 110° C.
Water absorption _____ 3.0 vol. percent.

EXAMPLE 3

About 70.0 parts of polyester C are stirred with about 30.0 parts of a propoxylated ethylene diamine (OH number 450), about 2.0 parts of dimethyl benzylamine, about 0.3 part of polyisoxane polyalkylene glycol ester and about 6.0 parts of sodium-castor oil sulphate (50% water). After incorporating about 110.0 parts of diphenylmethane-4,4'-diisocyanate (90%), a flame-resistant foam plastic is obtained which has the following physical properties:

Weight per unit volume _____ 45 kg./m.³.
Compressive strength _____ 2.4 kg./cm.².
Impact toughness _____ 0.3 kg./cm.
Hot-bending strength _____ 112° C.
Water absorption _____ 3.5 vol. percent.

EXAMPLE 4

About 70.0 parts of polyester D are thoroughly stirred with about 30.0 parts of a propoxylated ethylene diamine (OH number 450), about 2.0 parts of methyl morpholine, about 0.3 part of polysiloxane polyalkylene glycol ester and about 6.0 parts of sodium-castor oil sulphate (50% water). About 148.0 parts of diphenylmethane-4,4'-diisocyanate (90%) are added to the mixture and a dfficulty combustible hard foam plastic is obtained which has the following mechanical properties:

Weight per unit volume _____ 51 kg./m.³.
Compressive strength _____ 3.1 kg./cm.².
Impact toughness _____ 0.3 kg./cm.
Hot-bending strength _____ 108° C.
Water absorption _____ 2.8 vol. percent.

EXAMPLE 5

About 70.0 parts of polyester E are thoroughly stirred with about 30.0 parts of a propoxylated phosphoric acid (OH number 380), about 2.0 parts of permethylated aminoethyl piperazine, about 0.3 part of polysiloxane polyalkylene glycol ester and about 6.0 parts of sodium-castor oil sulphate (50% water). After incorporating about 101.0 parts of diphenylmethane-4,4'-diisocyanate (90%), a flame-resistant foam plastic is obtained which has the following properties:

Weight per unit volume _____ 49 kg./m.³.
Compressive strength _____ 3.3 kg./cm.².
Impact toughness _____ 0.2 kg./cm.
Hot-bending strength _____ 118° C.
Water absorption _____ 3 vol. percent.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. In the process for the preparation of polyurethane plastics by the reaction between organic compounds containing at least two active hydrogen containing groups as determined by the Zerewitinoff method, an organic polyisocyanate, a blowing agent, a catalyst and a stabilizer, the improvement which comprises reacting a polyhydric alcohol with a halogented polycarboxylic acid in the preparation of said organic compound containing active hydrogen containing groups, said polycarboxylic acids having been obtained by the substitution addition reaction of an α,β-unsaturated polycarboxylic acid with a halogen and an aliphatic hydrocarbon having at least four carbon atoms, an araliphatic hydrocarbon having at least four carbon atoms in the aliphatic chain or a carboxylic acid having only one carboxyl group as the sole hydrogen containing group.

2. The process of claim 1 in which the halogen is chlorine.

3. The process of claim 1 in which the halogen is bromine.

4. The process of claim 1 in which the α,β-unsaturated polycarboxylic acid is maleic anhydride.

5. The process of claim 1 in which the polyhydric alcohol is diethylene glycol.

6. The process of claim 1 in which the compound capable of adding across the double bond is a hydrocarbon having at least four carbon atoms.

7. The process of claim 1 in which the radical forming condition is ultra-violet irradiation.

8. The process of claim 1 in which the polyhydroxyl compound obtained is thereafter halogenated.

9. The process of claim 1 in which the polyhydroxyl compound is mixed with other polyhydroxyl compounds such as those selected from the group consisting of polyesters, polyethers, polythioethers, polyacetals, simple adducts of alkylene oxides with polyamines, alkylene oxide adducts of acrylonitrile compounds, polyphosphites and alkoxylated phosphoric acids.

10. The product of the process of claim 1.

References Cited

UNITED STATES PATENTS

| | | | |
|---|---|---|---|
| 2,621,166 | 12/1952 | Schmidt et al. | 260—75 |
| 2,973,332 | 2/1961 | Fikentscher et al. | 260—26 |

DONALD E. CZAJA, *Primary Examiner.*

LEON J. BERCOVITZ, *Examiner.*

J. J. KLOCKO, *Assistant Examiner.*